United States Patent Office 2,735,976
Patented Feb. 21, 1956

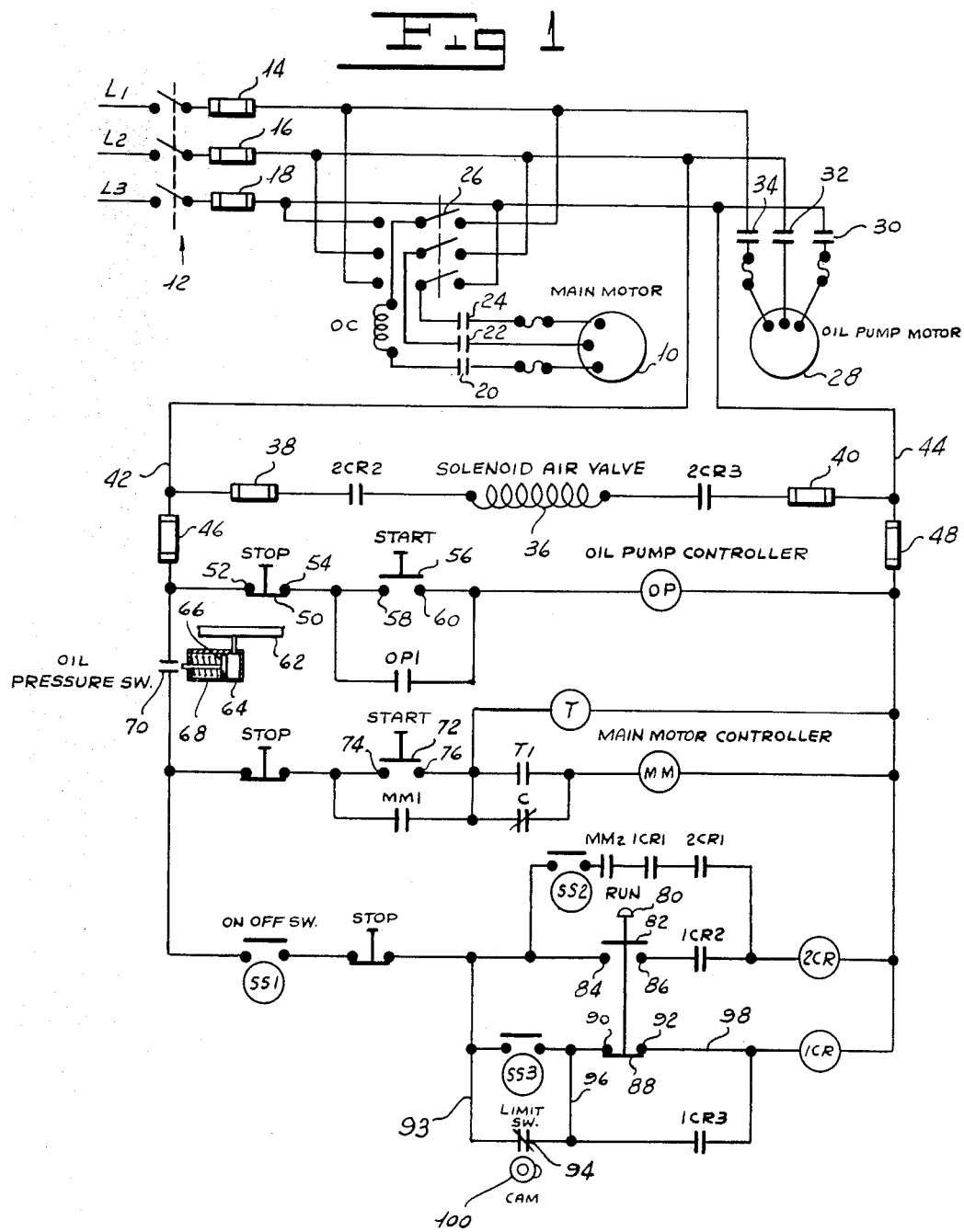

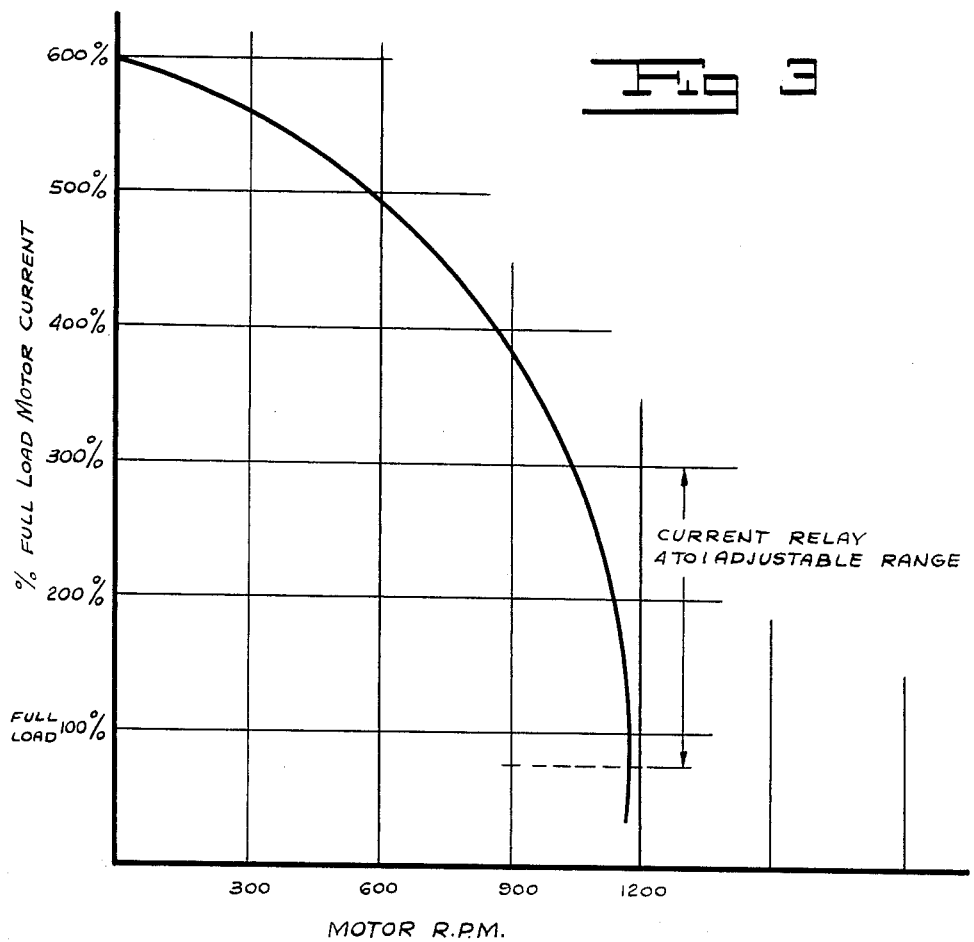
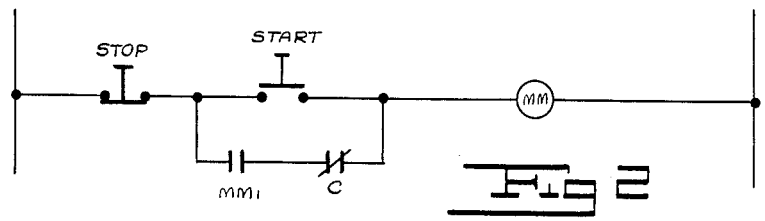

2,735,976

MOTOR CURRENT ACTUATED PRESS CONTROL CIRCUIT

James C. Danly, River Forest, Ill., assignor to Danly Machine Specialties, Inc., Chicago, Ill., a corporation of Illinois Application September 15, 1951, Serial No. 246,830

1 Claim. (Cl. 318—447)

My invention relates to a motor current actuated press control circuit, and more particularly to a press control circuit for power presses in which an increase in motor current is adapted to stop the prime mover of the press.

Power presses are large and expensive pieces of machinery and employ dies which are costly and time consuming to construct. For many operations tungsten carbide dies are employed. These dies are very expensive and brittle. If through inadvertence or accident a plurality of sheets of stock are fed to the power press, the expensive dies may be destroyed. In order to protect the dies it has become the practice to lower the air pressure which operates the clutch. In event of a stack-up the reduced air pressure permits the clutch to slip.

The energy for the forming operation of the press is derived from the prime mover motor. The clutch is adapted to handle ten to twenty times the torque of the motor in usual practice. A motor has not sufficient torque to drive the power press through the forming operation. The power press operates through energy which is stored in the flywheel during the time the clutch is disengaged. The press is set in operation by disengaging the brake and engaging the clutch so that the continuously rotating flywheel is coupled to the driving frame of the press. When low air pressure is applied to the clutch it permits the clutch to slip readily if an unusual or excessive load is encountered, as for example in the case of a stack-up. When slippage occurs energy is taken out of the flywheel at a greater rate than energy is supplied by the motor. This causes the motor to slow down. As soon as the motor slows down the back E. M. F. is immediately reduced and the current increases sharply. I propose to use this increase in current to operate a relay to stop the motor. If the motor were permitted to run the clutch lining would wear rapidly and the resultant heat would cause lining material to soften, thus compounding the wear.

One object of my invention is to provide a motor current actuated press control circuit in which an increase in current in the motor circuit would automatically stop the motor.

Another object of my invention is to provide a current actuated press control circuit adapted to be used with presses whose clutches operate at low air pressures to permit slippage upon the encountering of increased resistances due to stack-ups, malalignments or other causes.

Other and further objects of my invention will appear from the following description.

In the accompanying drawings which form part of the instant specification and which are to be read in conjunction therewith and in which like reference numerals are used to indicate like parts in the various views:

Fig. 1 is a diagrammatic view of a press control circuit containing one embodiment of my invention.

Fig. 2 is a fragmentary schematic view of a variant of a portion of the circuit shown in Fig. 1.

Fig. 3 is a typical curve showing motor current plotted against the R. P. M. of the motor.

Fig. 4 is a switch selection chart showing the positions of switches for selection of single-stroke or momentary, continuous, and inching operation.

In general, my invention contemplates the provisions of an overload relay in the main motor current channel. The relay controls a normally closed contact so that current will be continuously supplied to the main motor controller. The relay is so adjusted that upon increase in current due to clutch slippage and the ensuing slow-down of the motor armature, the increase of current will open the normally closed contact to de-energize the motor controller to stop the main motor. A shunt-line bypassing the normally closed overload current relay contact may be provided to permit the motor to continue to run during the starting period and until a full load of current is passing through the relay winding. In a modified form of the invention the normally closed contact which will open during the starting period is adapted to be shunted by a starting switch which will be closed by hand and held in closed position until the motor picks up speed.

More particularly, referring now to the drawings, the main motor 10 may for example be a 7½-horsepower, 1200-R. P. M. motor energized by a 220-volt, three-phase, 60-cycle alternating voltage fed to the motor through lines L1, L2 and L3. The lines are protected by a circuit breaker indicated generally by the reference numeral 12 and by fuses 14, 16, and 18. The main motor control MM is adapted to control normally open contacts 20, 22 and 24 to energize the main motor. To energize the main motor, a manually-operated gang switch 26 is provided. An oil pump motor 28 is controlled by an oil pump motor control OP which when energized will close normally open contacts 30, 32 and 34. By way of example and not by way of limitation, the oil pump motor may be a ½-horsepower motor adapted to rotate at 900 R. P. M.

The clutch is controlled by a solenoid 36 which when energized is adapted to operate an air valve to permit air to go to the clutch-operating cylinder to engage the clutch. The solenoid air valve, furthermore, acts to disengage a brake normally provided to immobilize the gear train of the press. Since this is well known in the art and forms no part of the instant invention, it has not been shown.

The solenoid 36 is protected by fuses 38 and 40 and is energized only when normally open contacts 2CR2 and 2CR3 are closed. Contact 2CR2 is controlled by relay winding indicated diagrammatically by 2CR. Contact 2CR3 is likewise controlled by relay 2CR. The oil pump controller is placed across conductors 42 and 44 and is protected by fuses 46 and 48. A stop-switch armature 50 normally bridges contacts 52 and 54. A starting armature 56 is normally open and adapted when operated to complete a circuit through the oil pump controller OP by way of contacts 58 and 60. As soon as the oil pump operates, oil is discharged through a pipe 62 which communicates with a cylinder 64 and is adapted to actuate a piston 66 against the action of a spring 68. When the piston 66 moves to the left it will close normally open contact 70 which comprises an oil pressure switch. It will be observed that the line to main motor controller MM is adapted to be interrupted by the switch 70 so that in event of failure of oil pressure, the main motor will automatically stop and the entire control circuit will be de-energized to disengage the clutch. In the energization of the oil pump controller relay assembly OP, normally open contact OP1 which bridges the starting armature 56 will close. The arrangement is such that when the starting button for the oil switch is released the circuit through the oil pump control assembly will be maintained through contact OP1.

The main motor-controller MM is adapted to be energized when starting armature 72 bridges the circuit across contacts 74 and 76 by pressing the starting button.

Reference is now had to Fig. 3 in which a typical curve showing motor current against motor speed is shown. It will be observed that when the motor starts the motor current may be as high as 600% of full load current which is plotted as 100%. As the motor speed increases the current drops sharply. The relay winding OC controls a normally closed contact C to open the contact when a 300% increase in current is reached and to permit the contact to close when the current is less than 300% of full load current. The relay furthermore is adjustable, as is well known in the art, so that a variation in the percentage of current increase may be readily achieved. This is necessary as for some type of work it may not be desirable to stop the press motor for every slight reduction in motor speed since there may be a reduction in motor speed in working on heavy stock which would be normal for a particular operation. The details of adjusting the range of the relay are not shown since these are well known to the art, such as means to change the bias on the armature against which the electromagnetic pull of the coil OC acts. Similarly for certain types of work with especially brittle dies, it may be desirable to have the contact C open to stop the motor for a small variation of current. The adjustment of the relay OC however, should be within the range of normal fluctuations of current due to line-voltage changes which may occur in a location due to the switching on and off of other equipment or variations in line voltage due to the powerhouse generator.

I provide a timer T which is adapted to hold normally open contact T1 closed for a predetermined time and then permit it to return to its normally open position. The function of the timer is to provide a path to the current through main motor controller MM during the starting period when the motor is achieving its speed. When the starting button is pressed current will flow across the armature 72 and across closed contact T1 and through the relay winding of the main motor controller MM. As soon as the winding of controller MM is energized normally open contact MM1 and normally open contact MM2 will close. Normally closed contact C, however, will be opened due to the large current flowing through winding OC during the starting period. Accordingly, current will flow through the closed contact T1 during this time. The adjustment of the timer is such that when the contact T1 opens the motor will have reached its speed and contact C will be closed. The closing of contact MM1 will bridge the starting button and maintain the main motor controller energized when the starting button is released. The main motor controller is energized either by current through contact T1 or contact C.

If an overload occurs while the motor is running after the timer has opened contact T1, then contact C will open to de-energize the main motor controller relay assembly MM. This will open contacts 20, 22 and 24 to stop the main motor.

Referring now to Fig. 2 I have shown a variant portion of the circuit just described. In this case no timer is used but the starting button is bridged by contact C and contact MM1. The pressing of the starting button energizes main motor controller assembly MM. The starting button is held in a closed position manually until the motor reaches speed. The energization of the relay assembly MM will close contact MM1 when the motor reaches speed. Contact C will close at this time. The starting button is bridged by a shunt circuit containing both the contacts MM1 and C. If an overload causes slipping of the clutch and ensuing slowing down of the motor with the resulting increase in motor current, contact C will open to de-energize the main motor controller relay.

The remainder of the circuit, which mainly concerns the activation and deactivation of the air pressure operated clutch between the main motor and the press it drives and the selection of press operating sequences as indicated in the chart of Fig. 2 is shown in the interest of completeness, can best be understood by a description of its operation. We will assume that the oil pump is running and that the main motor has been started and is up to speed. At this time the clutch is disengaged and the brake is set. Let us assume further that switch SS1 which is operated by a key-controlled member is closed, thus energizing the control circuit. Let us assume that we want single-stroke operation. A key-operated switch is controlled to close the switch SS2. When the run button 80 is pressed its armature 82 will bridge switch points 84 and 86. Before the run button is pressed its second armature 88 normally closes the circuit across switch points 90 and 92. As soon as switch SS1 is closed current flows through conductor 93 through normally closed limit switch 94, through conductor 96, through armature 88, through conductor 98 and through relay winding 1CR. The energization of relay 1CR will close contact 1CR1 and contact 1CR2 as well as contact 1CR3. When the run button 80 is pressed the opening of armature 88 will not de-energize 1CR since holding contact 1CR3 is now closed. When armature 82 completes the circuit through relay 2CR this relay will become energized to close contact 2CR1, contact 2CR2 and contact 2CR3. The closing of contact 2CR1 will serve to maintain relay winding 2CR energized when run button is released. Since contacts 2CR2 and 2CR3 are closed, the clutch will become engaged and the brake released permitting the press to operate. After the press has performed its work and as it is nearing the top of its stroke, the cam 100 which is driven from the driving train of the press, as is well known in the art, will open the limit switch 94. This breaks the circuit through relay winding 1CR and de-energizes winding 2CR by opening contact 1CR1. As soon as relay 2CR is de-energized contacts 2CR2 and 2CR3 are opened, thus permitting the clutch to become disengaged and the brake to be set. As is well understood in the art, the clutch is engaged by air pressure against the action of springs, while the brake is set by springs against the action of air pressure.

If during the operation of the cycle just described a stack-up should occur, the clutch will slip due to the low air pressure which serves to set the clutch as compared with the strength of the springs tending to release the clutch so that the clutch pressure is made effectively low enough to permit slippage in the face of increased resistance over that anticipated. During the working cycle the slipping of the clutch will take energy out of the flywheel at a greater rate than energy is supplied by the motor, thus causing the motor to slow down. This slowing down of the motor increases the motor current and operates the relay OC to open contact C to de-energize the motor controller relay MM to stop the motor, thus protecting the clutch from heat and wear. The slipping of the clutch protects the work while the stopping of the motor protects the clutch.

In practice I have been able to stop the motor within one second after the clutch slippage begins. This small duration of slippage is insufficient adversely to affect the clutch or the clutch lining.

Let us now assume we wish the press to run continuously. This is done by shunting out the limit switch 94, by closing the key-operated switch SS3 and by momentarily pressing and releasing push button 80.

If we wish to inch the press, key control switch SS2 is opened and only switches SS1 and SS3 are closed. As soon as switch SS1 is closed, relay 1CR is energized as before through switch SS3 or the limit switch or both. The press will then only run when the run button is held down. This is due to the fact that the holding circuit which is established by the energization of relay winding 2CR is interrupted by the open SS2 switch contact. Since it is desirable to inch the press across the region when the limit switch would normally interrupt the circuit, we close switch SS3 to shunt the limit switch 94.

It will be seen that I have accomplished the objects of my invention. I have provided a motor current actuated press control circuit in which the clutch is adjusted to permit slippage to protect the dies and the press in the case of inadvertent overloads due to stack-ups, maladjustment of the dies, use of heavier stock than intended, or the like. I have provided means for protecting the clutch as soon as slippage occurs by stopping the main motor. But for my invention the method of protecting the press and dies by the use of low clutch air pressures could not be successfully employed without causing serious damage to the clutch and clutch linings, due to wear and heat. If no means for stopping the motor after a slippage occurs is provided, not only will the clutch linings be worn or destroyed but the high heat generated by the friction will warp clutch parts and damage the clutch permanently.

It will be understood that certain features and subcombinations are of utility and may be employed without reference to other features and subcombinations. This is contemplated by and is within the scope of my claim. It is further obvious that various changes may be made in details within the scope of my claim without departing from the spirit of my invention. It is therefore to be understood that my invention is not to be limited to the specific details shown and described.

Having thus described my invention, what I claim is:

A control assembly for power presses including in combination a motor, a circuit for energizing the motor, a normally open switch in the motor circuit, a relay winding in the motor circuit, electromagnetic means for closing the normally open motor circuit switch, a circuit for energizing the electromagnetic means including a normally open manually operable switch and a normally closed relay contact in series, a normally open relay contact, circuit means including the normally open relay contact for shunting the normally open manually operable switch, a normally open time-controlled switch, circuit means including the time-controlled switch for shunting the normally closed relay contact, means for closing the normally open relay contact upon energization of the electromagnetic means, time-controlled means for closing for a predetermined time interval the time-controlled switch upon the closing of the manually operable switch, said motor circuit relay winding adapted to open the normally closed relay contact when a predetermined excess of normal current flows through the motor circiut.

References Cited in the file of this patent
UNITED STATES PATENTS

| | | |
|---|---|---|
| Re. 18,000 | Pfeifer | Mar. 17, 1931 |
| 1,913,993 | Mader | June 13, 1933 |
| 2,085,116 | McShane | June 29, 1937 |
| 2,376,658 | Charbonneau et al. | Mar. 22, 1945 |
| 2,534,751 | Barrows | Dec. 19, 1950 |